(12) United States Patent
Kwon

(10) Patent No.: US 7,110,330 B2
(45) Date of Patent: Sep. 19, 2006

(54) METHOD OF PROVIDING SUB-CODE DATA OF OPTICAL DISC DRIVE TO HOST COMPUTER

(75) Inventor: Young-sig Kwon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 257 days.

(21) Appl. No.: 09/938,815

(22) Filed: Aug. 27, 2001

(65) Prior Publication Data

US 2002/0089902 A1   Jul. 11, 2002

(30) Foreign Application Priority Data

Jan. 11, 2001   (KR) ................................. 2001-1548

(51) Int. Cl.
*B11B 21/08* (2006.01)
(52) U.S. Cl. ................................. 369/30.23; 369/47.32
(58) Field of Classification Search ............ 369/30.27, 369/30.23, 47.34, 47.33, 47.32, 30.24; 711/2, 711/3, 4, 102, 103, 104, 105, 111; 710/53, 710/52
See application file for complete search history.

(56) References Cited

U.S. PATENT DOCUMENTS

| 4,841,505 | A | * | 6/1989 | Aoyagi ..................... 369/30.12 |
| 4,996,679 | A | * | 2/1991 | Yoshio ..................... 369/30.25 |
| 5,038,660 | A | * | 8/1991 | Watanabe .................... 84/601 |
| 5,097,459 | A | * | 3/1992 | Yoshio ..................... 369/47.29 |
| 5,365,502 | A | * | 11/1994 | Misono ........................ 369/18 |
| 5,471,441 | A | * | 11/1995 | Nonaka et al. .......... 369/30.11 |
| 5,499,252 | A |   | 3/1996 | Watanabe ................... 371/40.1 |
| 5,910,935 | A |   | 6/1999 | Takagi et al. ................. 369/54 |
| 5,930,209 | A | * | 7/1999 | Spitzenberger et al. .. 369/30.05 |
| 6,122,681 | A | * | 9/2000 | Aditya et al. ................. 710/52 |
| 6,163,515 | A | * | 12/2000 | Yamamoto ................. 369/53.2 |
| 6,185,640 | B1 | * | 2/2001 | Ross ........................... 710/53 |
| 6,430,120 | B1 | * | 8/2002 | Chritz et al. ............. 369/30.12 |
| 6,510,113 | B1 | * | 1/2003 | Yamaguchi et al. ..... 369/47.22 |

FOREIGN PATENT DOCUMENTS

| JP | 3-268286 | 11/1991 |
| JP | 5-217339 | 8/1993 |
| JP | 6-60615 | 3/1994 |

(Continued)

OTHER PUBLICATIONS

J. R. Watkinson, "Subcodes Explained", Electronics & Wireless World, vol. 92, No. 1607, Sep. 1, 1986, pp. 26-30.

*Primary Examiner*—Tan Dinh
(74) *Attorney, Agent, or Firm*—Staas & Halsey LLP

(57) ABSTRACT

A sub-code providing method that provides correct sub-code data when sub-code data is requested from a host when a reproduction mode is performed in an optical disc drive. In a method providing sub-code data to a host computer in an optical disc drive formed so that data from a pick-up is reproduced through a buffer, the method includes the operations of setting sub-code data whenever data of a predetermined unit is output from the buffer, and transmitting the set sub-code data to the host computer when the sub-code data is requested from the host computer during the reproduction mode. Therefore, it is possible to provide more accurate sub-code data to the host computer and to thus prevent the reproduction of unnatural screen during operations such as automatic reproduction or game CD reproduction.

17 Claims, 3 Drawing Sheets

FOREIGN PATENT DOCUMENTS

| | | |
|---|---|---|
| JP | 6-96529 | 4/1994 |
| JP | 6-275019 | 9/1994 |
| JP | 7-244855 | 9/1995 |
| JP | 9-282666 | 10/1997 |
| JP | 2000-90578 | 3/2000 |

* cited by examiner

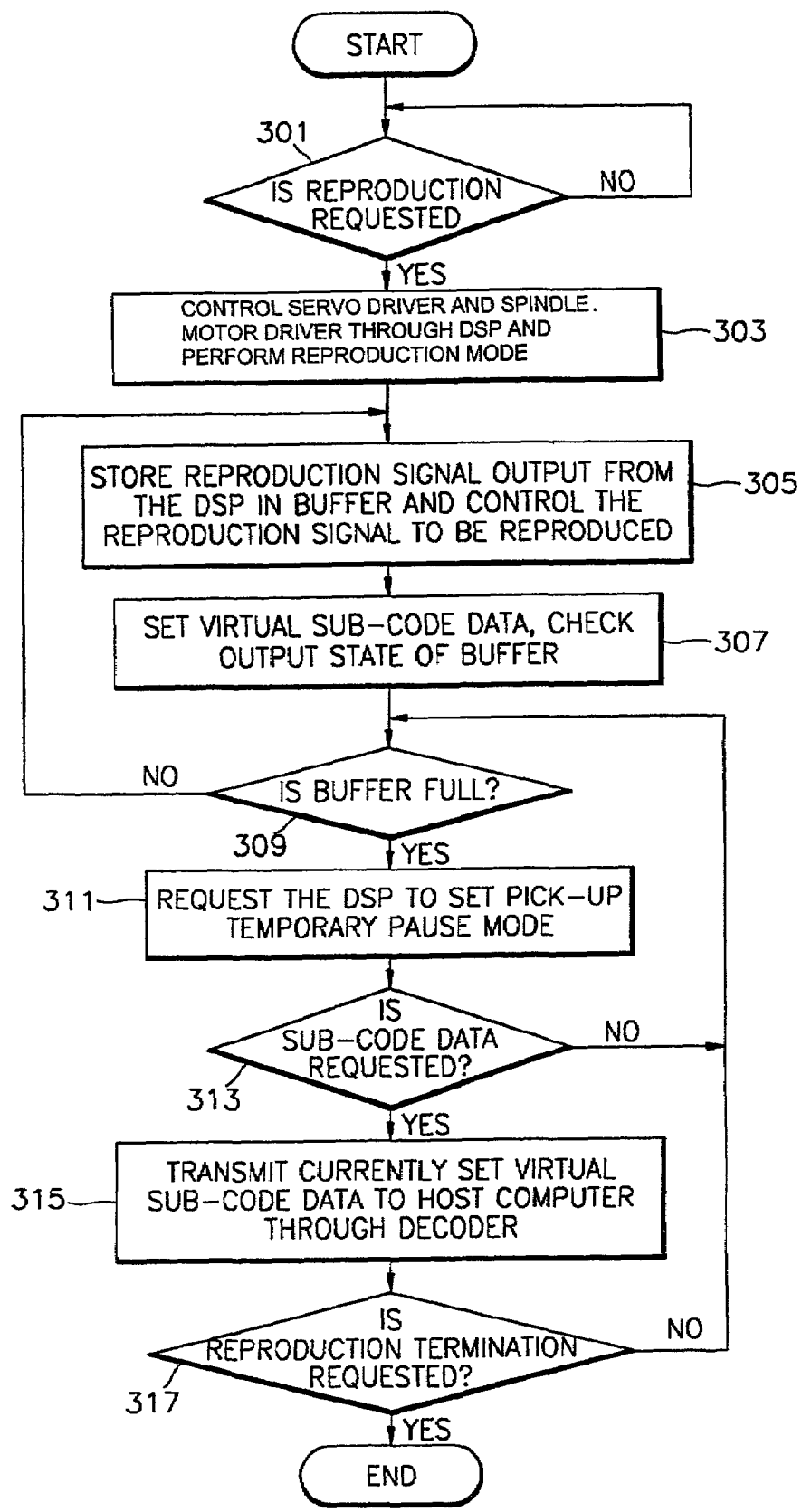

METHOD OF PROVIDING SUB-CODE DATA OF OPTICAL DISC DRIVE TO HOST COMPUTER

CROSS-REFERENCE TO RELATED APPLICATIONS

This application claims the benefit of Korean Patent Application No. 2001-1548 filed on Jan. 11, 2001, in the Korean Industrial Property Office, the disclosure of which is incorporated herein by reference.

BACKGROUND OF THE INVENTION

1. Field of the Invention

The present invention relates to a method of providing sub-code data of an optical disc drive, and more particularly, to a method of providing sub-code data of an optical disc drive to a host computer when the optical disc drive performs a reproduction mode.

2. Description of the Related Art

In general, a disc stores additional information other than data recorded in respective blocks on the disc. Information on the position of the recorded data among the additional information is sub-code data. For example, in the case of an audio disc, information, which is provided to a user so that the user can know which melody a currently reproduced audio signal is and what portion of the melody is currently being reproduced, is the sub-code data.

The sub-code data is recorded in the lead in (lead_in) region, the lead out (lead_out) region, and the data region (or the user region) of a disc. The sub-code data recorded in the lead in region is the table of contents (TOC) data including start time information on all the data recorded on the disc. The sub-code data for allowing the user to know the end position of the disc is stored in the lead out region.

The sub-code data for allowing the user to know the position of an actual reproduced block and a proceeding state, that is, information recorded on the optical disc, is stored in the data region. For example, a relative address for allowing the user to know the reproduction time (or the proceeding time) of a corresponding melody with respect to data recorded in a sector, and an absolute address for allowing the user to know a time, for which corresponding data is reproduced, (or a proceeding accumulating time) among the reproduction time of the entire disc, are stored in the data region. Therefore, the user can know the proceeding state of the currently reproduced data through the sub-code data recorded in a data region.

FIG. 1 is a block diagram of a general function of an optical disc drive for an audio disc, which is connected to a host computer. A loaded disc is driven according to the command transmitted from the host computer. FIG. 2 is a flowchart of the operation of a method of the optical disc drive shown in FIG. 1 providing the sub-code data to the host computer in the reproduction mode.

Referring to FIGS. 1 and 2, a conventional method of providing the sub-code data of the optical disc drive to the host computer will now be described.

First, when a command for requesting reproduction is transmitted from a host computer 109 through a decoder 105 in step 201, a micro computer 107 controls a servo driver 112 and a spindle motor driver 114 through a digital signal processor (DSP) 104 to perform the reproduction mode in step 203.

In step 205, the micro computer 107 controls the DSP 104 to convert a reproduction signal, read by a pick up 102 from a disc 101 and transmitted to the DSP 104 through an RF amplifier 103, into a digital signal, and then to transmit the converted reproduction signal to a buffer 106 through the decoder 105. When the converted reproduction signal, stored in the buffer 106 through the decoder 105, is applied to the DSP 104, the microcomputer 107 controls the DSP 104 so that the converted reproduction signal is transmitted to an audio signal processor 108. The reason why the buffer 106 is used is that the speed at which data on the disc is read by the pick-up 102 is higher than the speed of the signal reproduced through the audio signal processor 108.

When the reproduction mode is performed, the micro computer 107 continuously checks the state of the buffer 106. As a result of the check, when the state of the buffer 106 is determined to be full, the micro computer 107 requests the DSP 104 to set a temporary pause mode, as shown in step 209. Accordingly, the DSP 104 controls the servo driver 112 to allow the pick-up 102 to perform an operation according to the temporary pause mode.

At this time, when the sub-code data is requested by the host computer 109 (step 211), the micro computer 107 requests the DSP 104 to detect the position of the reproduced data from the disc (step 212). The DSP 104 then provides the subcode data based on the RF signal transmitted from the RF amplifier 103 to the host computer 109 through the decoder 105 in step 215.

In step 217, the micro computer 107 checks whether reproduction termination is requested. As a result of the check, when the reproduction termination is not requested, the process returns to step 207 and the above processes are repeated. When the reproduction termination is requested, the microcomputer 107 terminates the reproduction mode.

However, when the pick up 102 is set to be in a temporary pause mode as mentioned above, the pick up 102 repeatedly jumps a track of a certain position within a temporary pause region on the basis of the track, in which the buffer 106 is set to be in a full state. This means that the disc 101 continuously rotates by a spindle motor 115 even in the temporary pause mode.

Therefore, when the sub-code data is requested from the host computer 109 in a state where the pick up 102 is set to be in the temporary pause mode, the sub-code data including the error of the track according to the temporary pause region is provided on the basis of the track of the data finally stored in the buffer 106. Accordingly, the correct sub-code data is not provided to the host computer 109. This can lead to unnatural reproduction being performed during reproductions such as automatic reproduction or game CD reproduction.

SUMMARY OF THE INVENTION

Accordingly, it is an object of the present invention to provide a sub-code providing method that provides correct sub-code data when sub-code data is requested from a host computer when a reproduction mode is performed in an optical disc drive.

Additional objects and advantages of the invention will be set forth in part in the description which follows and, in part, will be obvious from the description, or may be learned by practice of the invention.

The foregoing and other objects of the present invention are achieved by providing a method that provides sub-code data to a host computer in an optical disc drive formed so that data from a pick-up is reproduced through a buffer. The method includes the operations of setting sub-code data whenever data of a predetermined unit is output from the buffer, and transmitting the set sub-code data to the host computer when the sub-code data is requested from the host computer during the reproduction mode.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DESCRIPTION OF THE PREFERRED EMBODIMENTS

Figure 1:
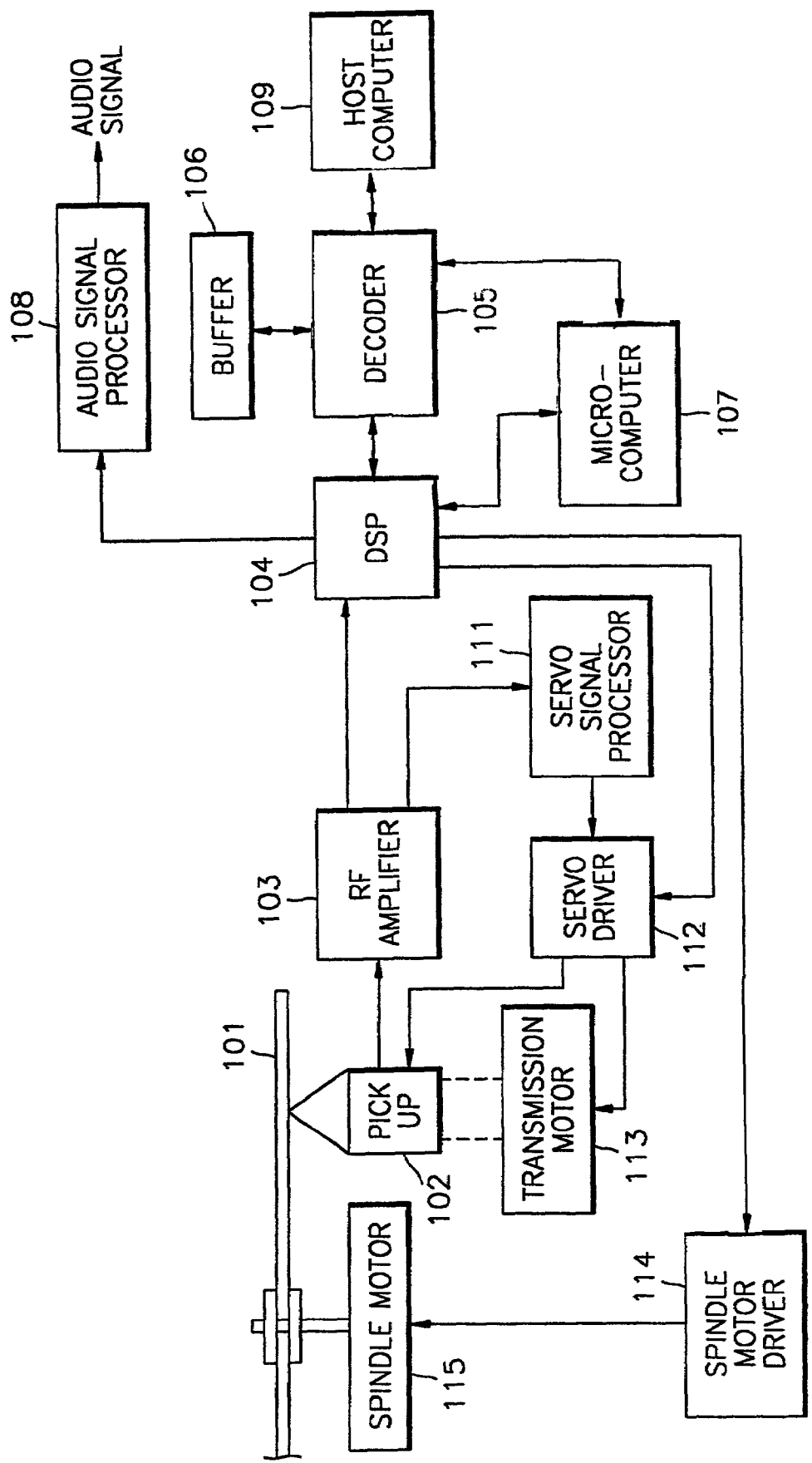
FIG. 1 is a block diagram showing a general function of an optical disc drive connected to a host computer.
Figure 2:
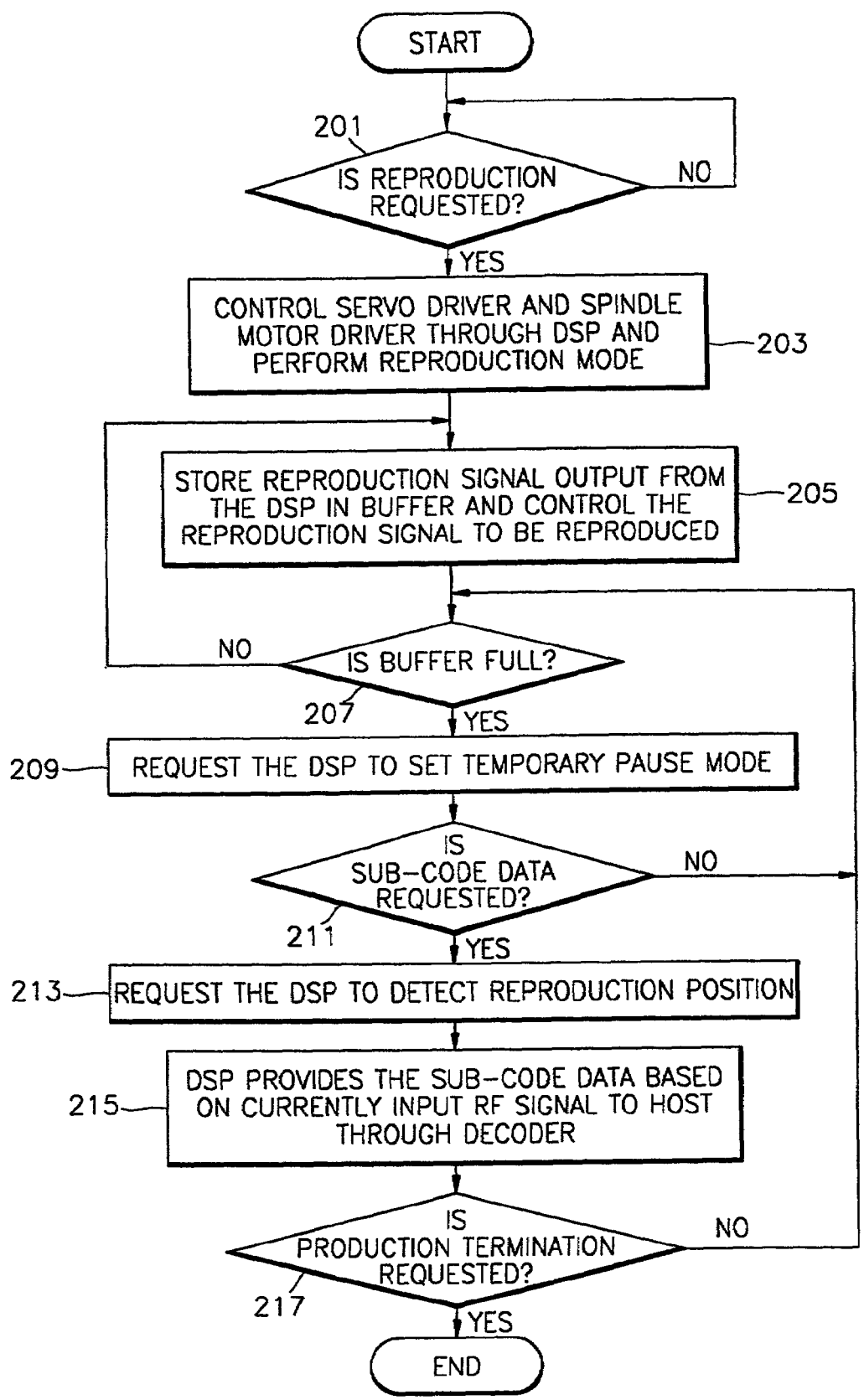
FIG. 2 is a flowchart of the operation of a conventional method of providing sub-code data in a reproduction mode; and FIG, 3 is a flowchart of an embodiment of a method of providing sub-code data according to the present invention in the reproduction mode.

Reference will now be made in detail to the embodiments of the present invention, examples of which are illustrated in the accompanying drawings, wherein like reference numerals refer to the like elements throughout. The embodiments are described below in order to explain the present invention by referring to the figures.

FIG. 3 is a flowchart of an example of a method of providing sub-code data according to the present invention during the reproduction mode of the optical disc drive shown in FIG. 1.

When reproduction is requested from a host computer 109 in step 301, the microcomputer 107 controls the servo driver 112 and the spindle motor driver 114 through the digital signal processor 104 to perform a reproduction mode in step 303.

In step 305, the microcomputer 107 controls the DSP 104, stores the result of digital signal processing of an RF signal output from the RF amplifier 103 in the buffer 106 through the decoder 105, and, when the digitally processed signal read from the buffer 106 is input from the decoder 105 to the DSP 104, the DSP 104 transmits the digitally processed signal to an audio signal processor 108, to perform the reproduction mode.

Then in step 307, the microcomputer 107 sets virtual sub-code data while checking the output state of the buffer 106 through the decoder 105. Namely, the virtual sub-code data is set whenever data of one sector is output from the buffer 106. The set virtual sub-code data is an absolute address, a relative address, and track information with respect to the currently output sector.

The absolute address is information showing corresponding reproduction time among the entire reproduction time of the disc 101. The relative address is information showing reproduction time of a corresponding melody when a plurality of melodies are recorded in the disc 101. Therefore, whenever data of one sector is output from the buffer 106, the microcomputer 107 sets the relative address and the absolute address to increase by one. The relative address resets when data of one sector from the buffer 106 is the last sector of the corresponding melody.

Whether the sector output from the buffer 106 is the last sector of an arbitrary melody is determined by a result provided by the microcomputer 107 on the basis of the table of contents (TOC) information stored in the buffer 106 before performing a reproduction mode. The table of contents (TOC) information includes start time information on all of the data recorded on the disc. The track information includes the purpose and the number of the corresponding track, and is set by the microcomputer 107 on the basis of the TOC information stored in the buffer 106.

When the reproduction mode is performed, the microcomputer 107 continuously checks whether the state of the buffer 106 is full in step 309. As a result of the check, when the state of the buffer 106 is not full, the process returns to the step 305 and the above steps are repeated. However, when the state of the buffer 106 is full, the microcomputer 107 requests the DSP 104 to set the pickup 102 to be in a temporary pause mode in step 311. Accordingly, the DSP 104 controls the servo driver 112 to allow the pickup 102 to operate in a temporary pause mode like in a conventional technology.

When the sub-code data is requested from the host computer 109 in step 313 in a state where the pickup 102 is set to be in the temporary pause mode, the microcomputer 107 transmits the currently set virtual sub-code data to the host computer 109 through the decoder 105 in step 315.

In step 317, a check is made as to whether the reproduction termination is requested from the host computer 109. As a result of the check, when the reproduction termination is not requested, the process returns to the step 309 and the above steps are repeated. However, when the reproduction termination is requested, the reproduction mode is terminated.

In the above embodiment, the virtual sub-code data set in the microcomputer 107 is provided when the sub-code data is requested from the host computer 109 when the pickup 102 is set to be in the temporary pause mode. It is possible also to provide the virtual sub-code data set in the microcomputer 107 even in the reproduction mode, in which the pickup 102 is not set to be in the temporary pause mode.

According to the present invention, when the sub-code data is requested from the host computer during a time at which the reproduction mode is performed in the optical disc drive, the virtual sub-code data, set on the basis of the signal actually reproduced by the microcomputer regardless of the driving of the servo, is provided to the host computer. Accordingly, it is possible to provide more accurate sub-code data than in the conventional technology, thus preventing the reproduction of an unnatural screen during reproduction, such as automatic reproduction or game CD reproduction.

Although preferred embodiments of the present invention have been shown and described, it will be appreciated by those skilled in the art that changes may be made in these embodiments without department from the principle and spirit of the invention, the scope of which is defined in the appended claims and their equivalents.

What is claimed is:

1. A method of providing sub-code data to a host computer in an optical disc drive formed so that data from a pick-up is reproduced through a buffer, comprising:

setting the sub-code data using a table of contents (TOC) information of a disc installed in the optical disc drive and a number of outputs of predetermined unit data whenever data of the predetermined unit is output from the buffer; and transmitting the set sub-code data to the host computer when the sub-code data is requested from the host computer in a state where the pick-up is set to be in the temporary pause mode during a reproduction mode.

2. The method of claim 1, wherein the sub-code data is set to include track information, a relative address, and an absolute address.

3. The method of claim 1, wherein the setting of the sub-code data comprises setting the sub-code data whenever the data of one sector unit is output from the buffer.

4. The method of claim 2, wherein said relative address contains information of reproduction time of a corresponding melody from a plurality of melodies recorded on the disc.

5. The method of claim 4, wherein the setting the sub-code data comprises increasing the relative address and the absolute address whenever the data of one sector is output from the buffer.

6. The method of claim 5, further comprising resetting the relative address when the data of one sector output from the buffer is the last sector of the corresponding melody.

7. The method of claim 6, further comprising determining the last sector of the corresponding melody based on information provided in the table of contents.

8. The method of claim 2, wherein the absolute address contains information of reproduction time of an entire portion of the disc.

9. The method of claim 4, wherein the absolute address contains information of reproduction time of an entire portion of the disc.

10. The method of claim 1, further comprising:
continuously checking whether the buffer is full during the reproduction mode;
setting the optical disc drive to the temporary pause mode and moving the pick-up to a temporary pause region of the disc in response to the buffer being full;
wherein the transmitting of the set sub-code data comprises transmitting the set sub-code data to the host computer when the sub-code data is requested from the host computer during the temporary pause mode.

11. The method of claim 1, wherein:
the setting of the sub-code data comprises setting the sub-code data using a microcomputer through a decoder which accesses the buffer; and
the transmitting of the set sub-code data comprises transmitting the set sub-code data from the microcomputer through the decoder to the host computer.

12. A method of providing sub-code data stored on a disc to a host computer in an optical disc drive formed so that data from the disc and read using a pick-up is reproduced through a buffer, the method comprising:
storing the data and the sub-code data read from the disc in the buffer during a reproduction mode;
reading the data from the buffer in predetermined units to the host computer;
setting a current item of the sub-code data using a table of contents (TOC) information of a disc installed in the optical disc drive and a number of outputs of predetermined unit data in response to one of the predetermined units of the data being read from the buffer while checking whether the buffer is full; and
transmitting the current item of the set sub-code data to the host computer in response to the buffer being full and a request from the host computer for the sub-code data in a state where the pick-up is set to be in the temporary pause mode during the reproduction mode.

13. A method of providing sub-code data stored on a disc to a host computer in an optical disc drive formed so that data from the disc and read using a pick-up is reproduced through a buffer, the method comprising:
storing the data and the sub-code data read from the disc in the buffer during a reproduction mode;
reading the data from the buffer in predetermined units to the host computer;
setting a current item of the sub-code data using a table of contents (TOC) information of a disc installed in the optical disc drive and a number of outputs of predetermined unit data in response to one of the predetermined units of the data being read from the buffer; and
transmitting the current item of the set sub-code data to the host computer in response to a request from the host computer for the sub-code data in a state where the pick-up is set to be in the temporary pause mode during the reproduction mode.

14. A method of providing sub-code data to a host computer in an optical disc drive, the method comprising:
reading data and sub-code data from an optical disc;
inputting the data in a buffer;
outputting the data from the buffer;
setting the sub-code data using a table of contents (TOC) information of a disc installed in the optical disc drive and a number of outputs of predetermined unit data in response to the data being output from the buffer; and
transmitting the set sub-code data to the host computer when the sub-code data is requested by the host computer during a reproduction mode in a state where the pick-up is set to be in the temporary pause mode during the reproduction mode.

15. A method of providing sub-code data to a host computer in an optical disc drive, the method comprising:
reading audio data and sub-code data from an optical disc;
reproducing the audio data through a buffer;
setting the sub-code data using a table of contents (TOC) information of a disc installed in the optical disc drive and a number of outputs of predetermined unit data in response to the audio data being output from the buffer; and
transmitting the set sub-code data to the host computer when the sub-code data is requested by the host computer in a state where the pick-up is set to be in the temporary pause mode during a reproduction mode.

16. A method of providing virtual sub-code data to a host computer in an optical disc drive formed so that data from a pick-up is reproduced through a buffer, the method comprising:
setting the virtual sub-code data using a table of contents (TOC) information of a disc installed in the optical disc drive and a number of outputs of predetermined unit data whenever the data of a predetermined unit is output from the buffer; and
transmitting the set virtual sub-code data to the host computer when the virtual sub-code data is requested from the host computer in a state where the pick-up is set to be in the temporary pause mode during a reproduction mode.

17. A method of providing sub-code data of an optical disc drive so that data from a pick-up is reproduced through a buffer, comprising:
setting the sub-code data using a table of contents (TOC) information of a disc installed in the optical disc drive and a number of outputs of predetermined unit data whenever the data of one sector unit is output from the buffer; and
transmitting the set sub-code data to a host computer when the sub-code data is requested from the host computer in a state where the pick-up is set to be in the temporary pause mode during a reproduction mode.

* * * * *